(12) United States Patent
Yi et al.

(10) Patent No.: US 7,409,147 B2
(45) Date of Patent: Aug. 5, 2008

(54) VIDEO PRESENTER WITH ARCH-TYPE SUPPORT

(75) Inventors: Hee-myoung Yi, Seongnam-si (KR); Joo-bok Kim, Seongnam-si (KR); Michel Arney, West Newton, MA (US); Alan Christopher Mudd, West Newton, MA (US); James Wilson, West Newton, MA (US)

(73) Assignee: Samsung Techwin Co., Ltd. (KR)

( * ) Notice: Subject to any disclaimer, the term of this patent is extended or adjusted under 35 U.S.C. 154(b) by 870 days.

(21) Appl. No.: 10/768,808

(22) Filed: Jan. 30, 2004

(65) Prior Publication Data

US 2005/0168627 A1 Aug. 4, 2005

(51) Int. Cl.
*G03B 15/02* (2006.01)

(52) U.S. Cl. .............................. 396/4; 396/5; 396/155; 396/428

(58) Field of Classification Search ...................... 396/4, 396/5, 155, 128, 419, 428; 348/63, 373, 348/375; D16/232; D14/423
See application file for complete search history.

(56) References Cited

U.S. PATENT DOCUMENTS

| | | | |
|---|---|---|---|
| 5,557,663 A | 9/1996 | Huang et al. ................ 379/110 |
| 5,594,502 A | 1/1997 | Bito et al. .................... 348/373 |
| 5,734,417 A | 3/1998 | Yamamoto et al. ............ 348/61 |
| 5,863,209 A * | 1/1999 | Kim ............................ 434/428 |
| 6,317,155 B1 * | 11/2001 | Ohyama ...................... 348/373 |
| D495,355 S * | 8/2004 | Mudd et al. ................. D16/232 |
| 6,969,033 B2 * | 11/2005 | van der Linden ......... 248/177.1 |
| 2003/0202224 A1 | 10/2003 | Moriya ........................ 358/475 |

FOREIGN PATENT DOCUMENTS

| | | |
|---|---|---|
| GB | 2374231 A | 9/2002 |
| JP | 07-074989 | 3/1995 |
| JP | 07-107377 | 4/1995 |
| JP | 09-163188 | 6/1997 |
| KR | P20-0211715 | 2/2001 |
| KR | 2003-0088520 A | 11/2003 |

* cited by examiner

*Primary Examiner*—W. B. Perkey
(74) *Attorney, Agent, or Firm*—Tuchman & Park LLC

(57) ABSTRACT

A video presenter of the invention includes a table with a top surface on which an object is to be positioned; a pivot member disposed at a side of the table; an arched or arc-shaped support arm rotatably coupled with the pivot member and extended therefrom; and, a camera head rotatably coupled with an end of the arched or arc-shaped support arm.

13 Claims, 9 Drawing Sheets

VIDEO PRESENTER WITH ARCH-TYPE SUPPORT

FIELD OF THE INVENTION

The present invention relates to a video presenter, more particularly to a video presenter or video image input device with an arch-shaped support arm.

BACKGROUND OF THE INVENTION

In general, a video presenter photographs an object using a CCD camera and displays the photographed object on a monitor, and is widely used for educational and industrial purposes. The video presenter can display a magnified image of a tiny object on the monitor by using a lens unit such as a microscope lens to magnify the object taken by the CCD camera. A variety of peripheral devices are included in the video presenter. For example, an apparatus for illuminating an object to improve a quality and sharpness of an image to be displayed through the monitor is additionally provided.

The video presenter may include a variety of arm structures for supporting the CCD camera. An optimal structure for supporting the camera should have such a configuration that the camera can effectively capture an image of the object. In part, this object requires that the support arm structure for supporting the camera should not interfere with the object. Also, it requires that a lamp for illuminating the object should not interfere with the object in order to provide an improved quality of captured images. In addition, it is further preferable that a table for positioning the object thereon provides an optimized usage of a space defined above the table.

Japanese Patent Application Publication No. hei 7-107377 discloses a video presenter having two support rods for supporting a camera which are rotatable by mean of joints or articulations. More specifically, a first support rod is rotatable with respect to a table and a second support rod while the second support rod is rotatable with respect to the first support rod and the camera. However, in this video presenter, the camera must be inconveniently disassembled when the video presenter is not in use and kept for storage. Also, the first and second support rods are rotatable only in the same direction. Thus, when the second support rod is approached towards the table, the second support rod cannot be sufficiently collapsed onto the table due to the volume of the camera.

Another example of the video presenter is disclosed in Korean Utility Model Registration No. 2011715. According to this disclosure, a support arm for supporting the camera is formed in a telescopic-manner so as to adjust a length of the support. Also, two lamps are provided at opposite sides of a table by means of separate support structures. This video presenter has a potential problem in that while the illuminating strength of the lamps may be intensified, the lamps are not able to be optimally adjusted relative to the object. Further, the support arms for supporting the camera and the lamp are formed into a rectilinear (i.e., straight) shape that may interfere with the object depending on their rotational position.

SUMMARY OF THE INVENTION

An object of the present invention is to provide an improved video presenter solving the above-described problems.

Another object of the present invention is to provide a video presenter having a structure and mechanism particularly effective for use and storage.

Another object of the present invention is to provide a video presenter in which the support arm for supporting the camera does not interfere with the object.

According to one aspect of the present invention, a video presenter comprises: a table with a top surface on which an object is placed; a pivot member mounted at a lateral side of the table; a support arm having a generally arched or arc-shaped configuration, the support arm extending from the pivot member and rotatably coupled with the pivot member; and, a camera rotatably coupled at a free end of the support arm.

According to another aspect of the present invention, the video presenter further comprises an illumination lamp attached to the support arm, preferably at an inner surface of the support arm. The illumination lamp preferably comprises a lamp mount fixed to the inner surface of the support arm, and a lamp holder having a lamp therein, the lamp holder rotatably coupled with the lamp mount.

According to another aspect of the present invention, the pivot member and the support arm of the video presenter are configured in such a way that the camera is not allowed to contact with the table when the support arm is rotated towards the table.

According to another aspect of the present invention, a rubber rim encloses an outer surface of the camera head.

BRIEF DESCRIPTION OF DRAWINGS

The above and other features and advantages of the present invention will become more apparent by describing in detail exemplary embodiments thereof with reference to the attached drawings in which:

FIG. 4 is a partially exploded perspective view of the video presenter of FIG. 1 with the lamp disassembled there-from.

DETAILED DESCRIPTION OF INVENTION

A preferred embodiment of the present invention will be described herein below with reference to the accompanying drawings.

Figure 1:
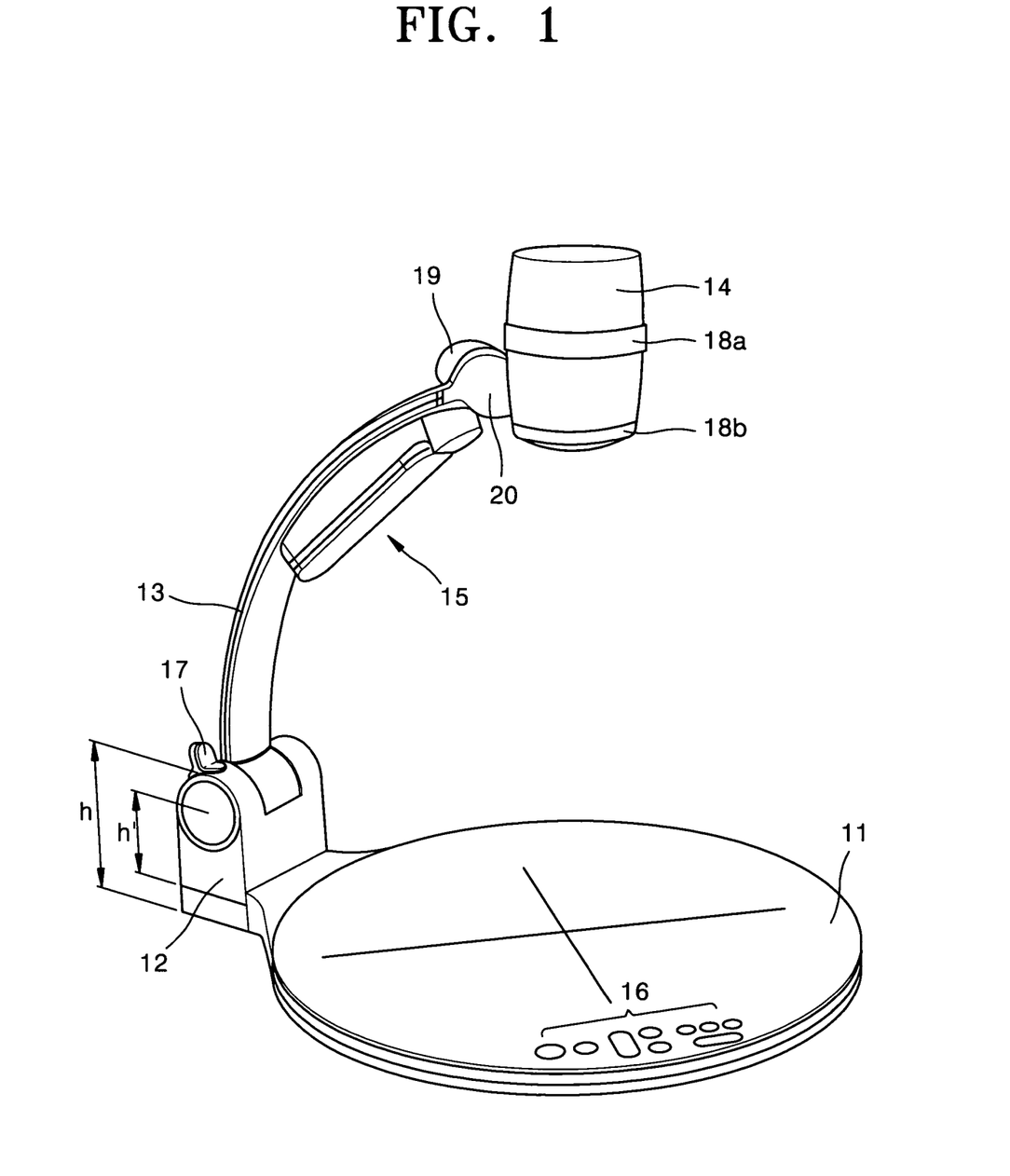
FIG. 1 is a perspective view of a video presenter according to an embodiment of the present invention.

FIG. 1 is a perspective view of a video presenter according to one embodiment of the present invention.

Referring to FIG. 1, a video presenter of the present invention generally comprises a table 11 on which an object is to be placed for capturing its image; a pivot member 12 disposed at one side of the table 11; a support arm 13 rotatably installed to the pivot member 12 and extended therefrom, and a camera head 14 roatablly installed at one end of the support 13. As shown, the support arm 13 is particularly configured in a generally arched or arc-like shape.

Inside of the table 11, an electronic circuit controller is provided for processing and controlling the operation functions of the video presenter. The table 11 has a predetermined thickness, so that a printed circuit board can be received therein. Also, on a top surface of the table 11, a control panel 16 is provided at one lateral side or adjacent thereto. A user can select and control various functions of the video presenter by manipulating buttons in the control panel 16. In an embodiment as shown in FIG. 1, the table 11 has a top surface in the shape of a circle. In other embodiments, however, the top surface of the table may be formed with a square shape or an oval shape. It should be appreciated that the video presenter of this particular invention is not restricted by the shape of the table.

The control panel 16 disposed on a top surface of the table 11 comprises a plurality of buttons. For example, it includes a power button, a lamp button, a zoom button, and one or more image control buttons. The upper surface of each of the buttons is maintained to the same level as the top surface of the table 11, thus the buttons do not protrude above the top surface of the table 11. As a result, the table 11 has a flat surface as a whole.

The pivot member 12 is installed at a lateral side of the table 11 and serves to support and rotatably couple with the support 13. The pivot member 12 includes a clamp lever 17. With manipulation of the clamp lever 17 by the user, the arch-like support 13 may be in a state rotatable with respect to the pivot member 12 or it may be in a fixed state immovable with respect to the pivot member 12. The pivot member 12, the clamp lever 17 and the support 13 may be configured in many different ways. For example, the support 13 has a rotation shaft (not shown) at a lower end thereof, and the pivot member 12 has a bearing (not shown) allowing rotation of the rotation shaft, so that the end of the support 13 can be rotatably coupled with respect to the pivot member 12. Further, the clamp lever 17 can be switched between first and second locations on the pivot member 12. At one of the locations, the clamp lever 17 can exert a pressing force onto the rotation shaft of the support 13 so as to prevent the support 13 from rotating. Korean Utility Model Application No. 1997-0052552, for example, discloses a mechanism for controlling an arm of the video presenter, and such known mechanisms may be applied to the present invention.

As seen from FIG. 1, a pivot member 12 has a height h measured from a bottom surface of the table 11. A distance from the top surface of the table 11 to the center of the rotation shaft of the support 13 is indicated as h'. The structures of the pivot member 12 and the support 13, and the height h of pivot member 12 and the distance h', are preferably adapted in such a way that the camera head 14 does not go beyond the table 11 when the support 13 rotates to make the camera head 14 in close contact with the top surface of the table 11.

As shown in the drawings and also discussed above, the support arm 13 is formed into a generally arched or arc-shaped configuration. The term "arched" or "arc-shaped" used in this application refers to a shape or configuration including arc-like, arch-like, bent, L-like, bracket-shaped, and the like. This shape of the support 13 is an important feature of the present invention. Making the support 13 into a "arched or arc-shaped" configuration, the camera head 14 mounted at the free end of the arched support 13 can be conveniently located generally above the center of the table 11 without adjusting the orientation of the support arm 13 and the camera head 14 frequently or to a great extent. Accordingly, the camera head 14 installed at the upper end of the arched support 13 can be easily oriented towards the object which is generally to be positioned above the center of the table 11. Also, the arched support 13 does not interfere with the object placed on the table 11. This is because the arched support 13 extends along a curved or bent path so that it may go round the region where the object is located. Further, the arched support 13 can easily provide a space for mounting a lamp 15 on its inner-curved surface, and thus, separate stand-alone type arms for supporting the lamp 15 can be eliminated.

At an upper end of the arched support 13, the camera head 14 is rotatably installed thereto. The camera head 14 comprises a camera housing and a camera housed therein. The camera housing, which forms the outer portion of the camera head 14, is integrally formed with a first pivot housing 20. The first pivot housing is mounted in a pivotable manner to a second pivot housing 19 which is disposed at the upper end of the arched support arm 13.

The first pivot housing 20 and the second pivot housing 19 may be configured in many different ways. For example, a pivot shaft (not shown) is fixed at the second pivot housing 19 and a bearing (not shown) is installed within the first pivot housing 20. Also, a leaf spring (not shown) is installed between opposite sides of the first pivot housing 20 and the second pivot housing 19 so as to provide an elastic-supporting force there-between. As a result, the first and the second pivot housings 20 and 19 are maintained in a self-rotation prevented state to each other due to a friction caused by the elastic force. When the user applies an external force overcoming the frictional force caused by the leaf spring, the camera head 14 is able to rotate. Those skilled in the art, however, will understand that the rotational structure for the camera head 14 may be accomplished in many different ways other than the above-described.

A rubber or elastic rims 18a and 18b enclose an outer surface of the camera head 14. As will be described herein below, the rubber rims 18a and 18b absorb the impact that may be occurring between the camera head 14 and the table 11 when the camera comes in contact with the top surface of the table 11. As can be seen from the drawings, the rubber rims 18a and 18b enclose a middle periphery and a lower periphery of the camera head 14, respectively.

The lamp 15 is installed at an inner portion of the curved surface of the support 13. As will be described in detail with reference to FIG. 4, the lamp 15 has a structure such that a lamp holder may be rotated with respect to a lamp mount. With the installation of the lamp 15 to the support 13, the lamp 15 occupies a position that is relatively close to the object located on the table 11. It also obviates a separate structure, such as stand-alone support arms known in the art, for supporting the lamp 15.

Figure 2:
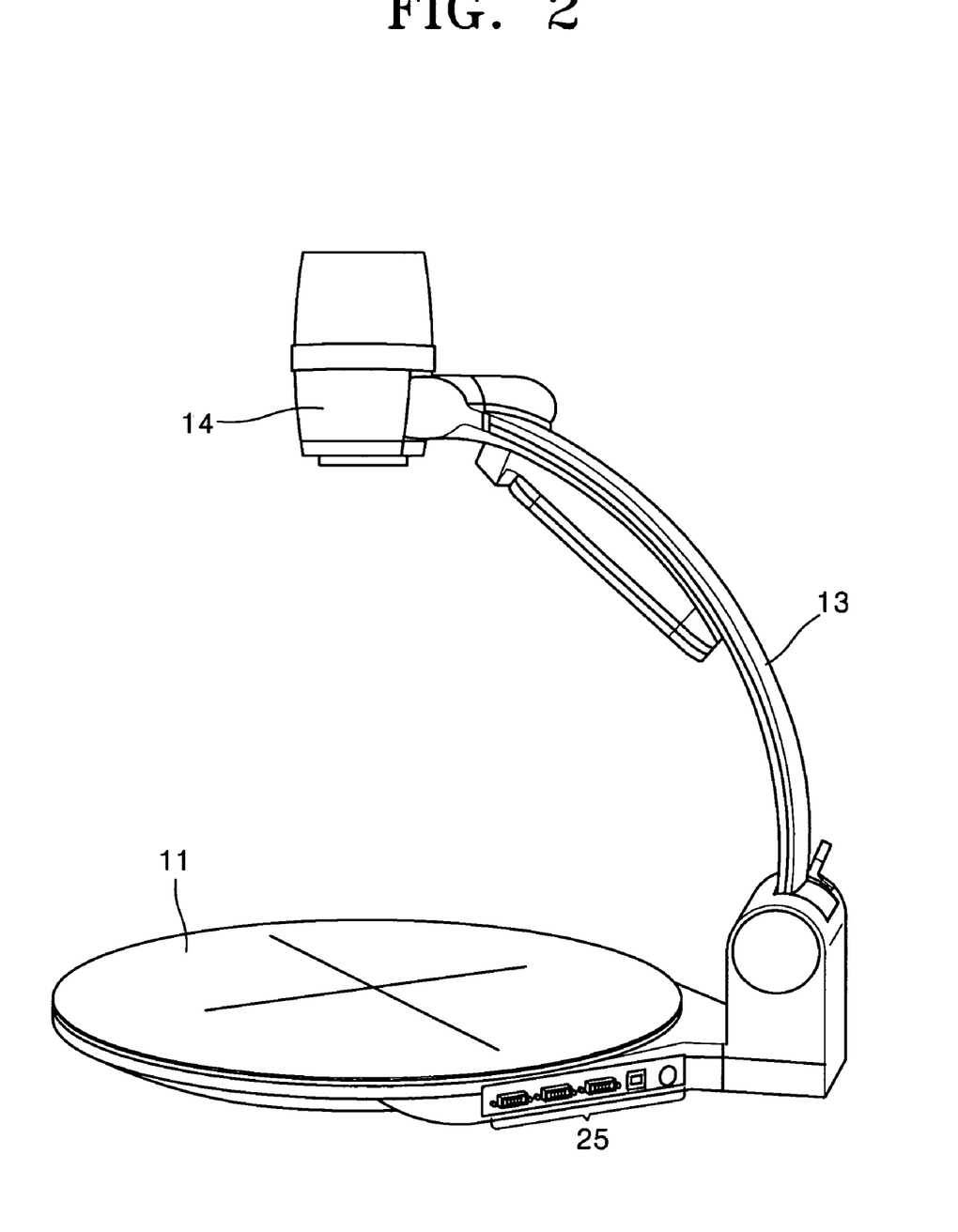
FIG. 2 is a perspective view of the video presenter of FIG. 1 shown at a different angle.
Figure 3:
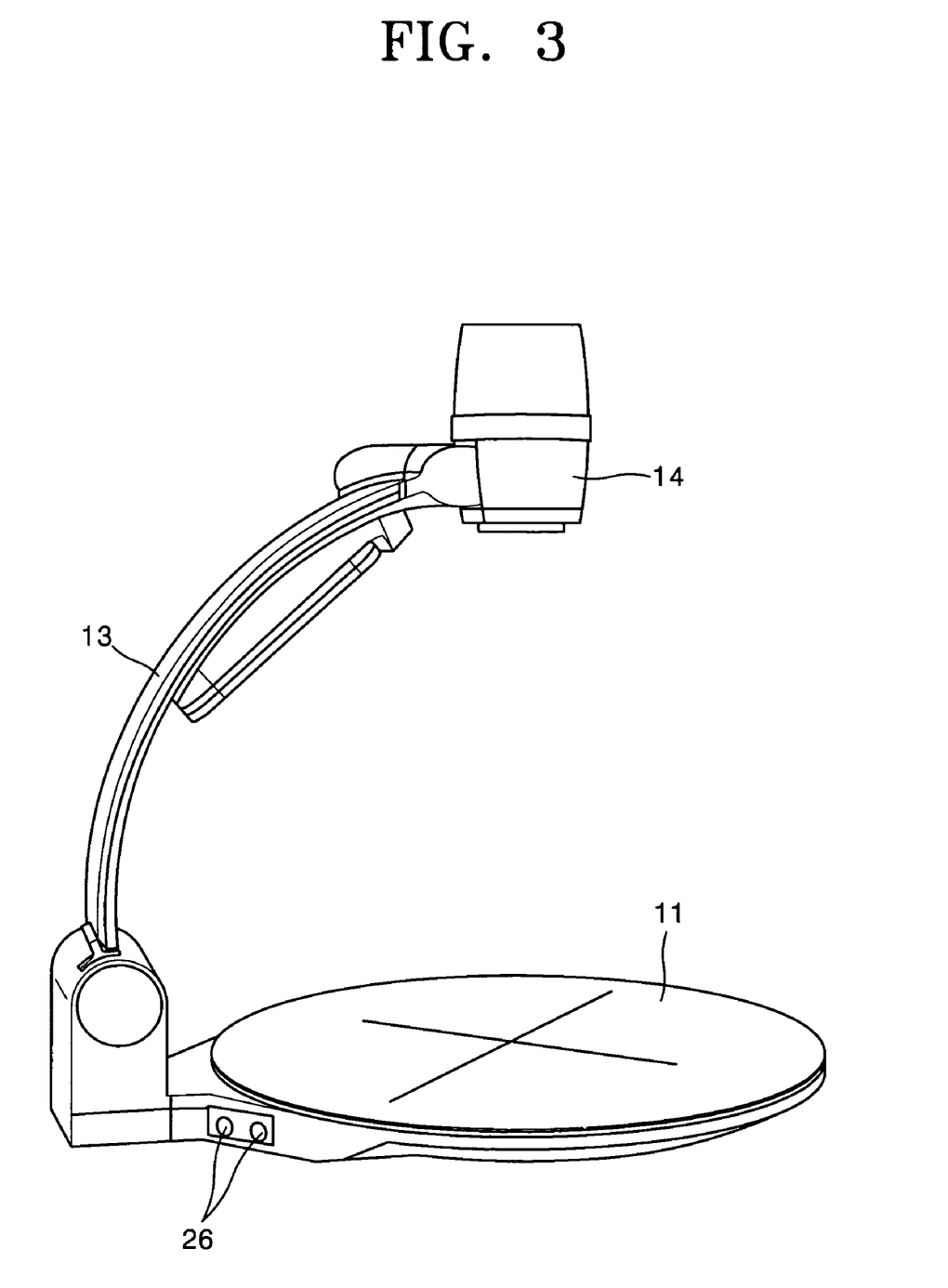
FIG. 3 is a perspective view of the video presenter of FIG. 1 shown at another different angle.

FIGS. 2 and 3 show a perspective view of the video presenter of FIG. 1 at different angles, respectively. Referring to FIG. 2, a plurality of connection ports 25 are provided at a side of the table 11 or at an extension thereof. The connection ports 25 are used to connect the video presenter to external peripheral devices. For example, the connection ports 25 may include a VGA out-port, a VGA in-port, an RS-232C port, an USB port and a mouse port. Referring to FIG. 3, power connectors 26 are provided at another side of the table 11. The power connectors 26 may include a DC 12 volt in-connector and a DC 12 volt out-connector.

Figure 4:
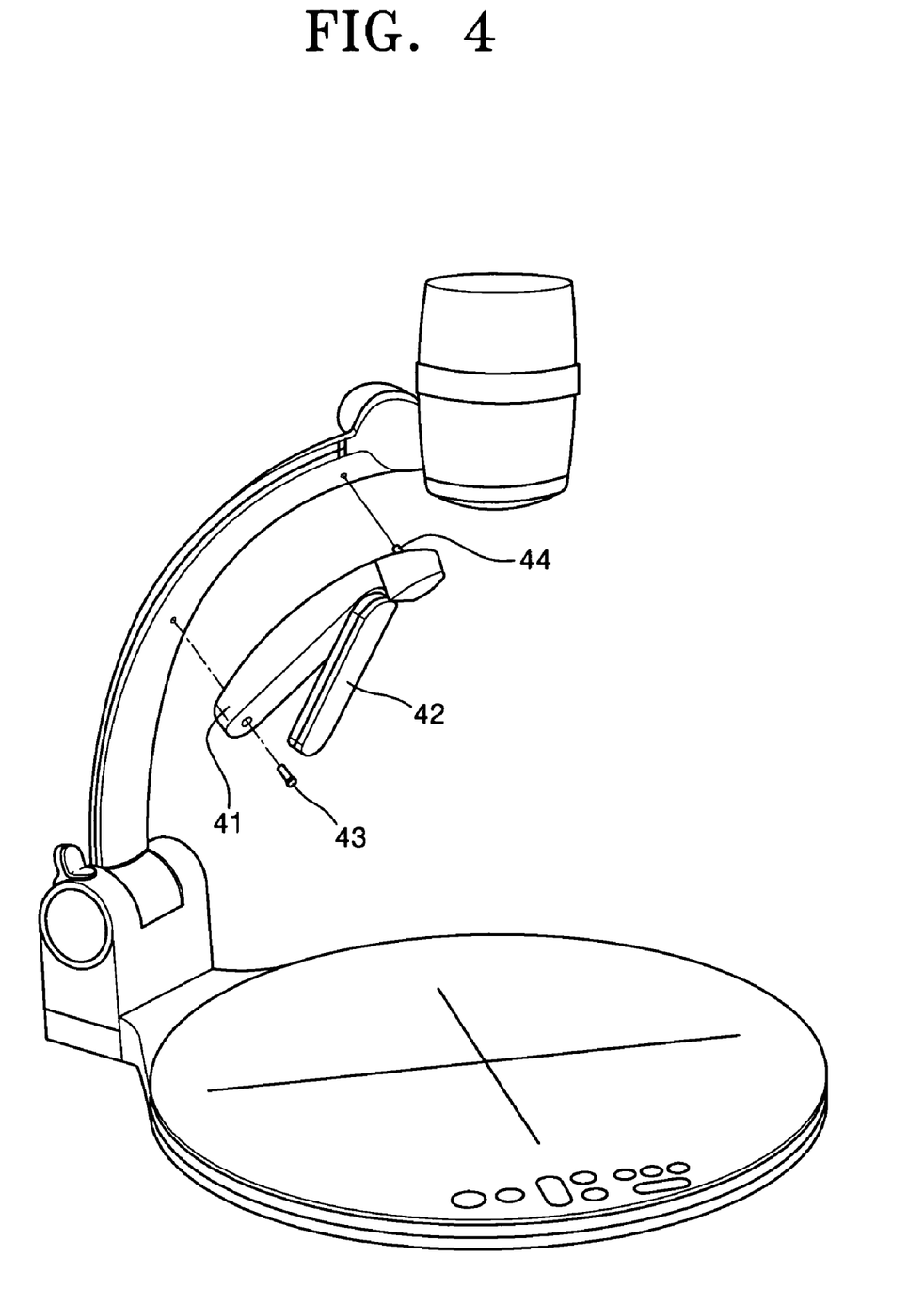

FIG. 4 shows a view that the lamp 15 is disassembled from the video presenter of FIG. 1. Referring to FIG. 4, the lamp 15 includes lamp mount 41 and lamp holder 42. The lamp mount 41 is affixed to the support 13 using bolts 43 and 44. The lamp mount 41 has a curved mounting surface corresponding to the curved inner surface of the support 13. A lamp tube (not shown) is provided within the lamp holder 42 which can generate light to illuminate the object on the table 11 at a close distance. One end of the lamp holder 42 is pivotably attached to the lamp mount 41 enabling rotation of the lamp holder 42.

With the pivotal rotation of the lamp holder 42 with respect to the lamp mount 41, the lamp 15 can illuminate the object on the table 11 at various different angles.

Figure 5:
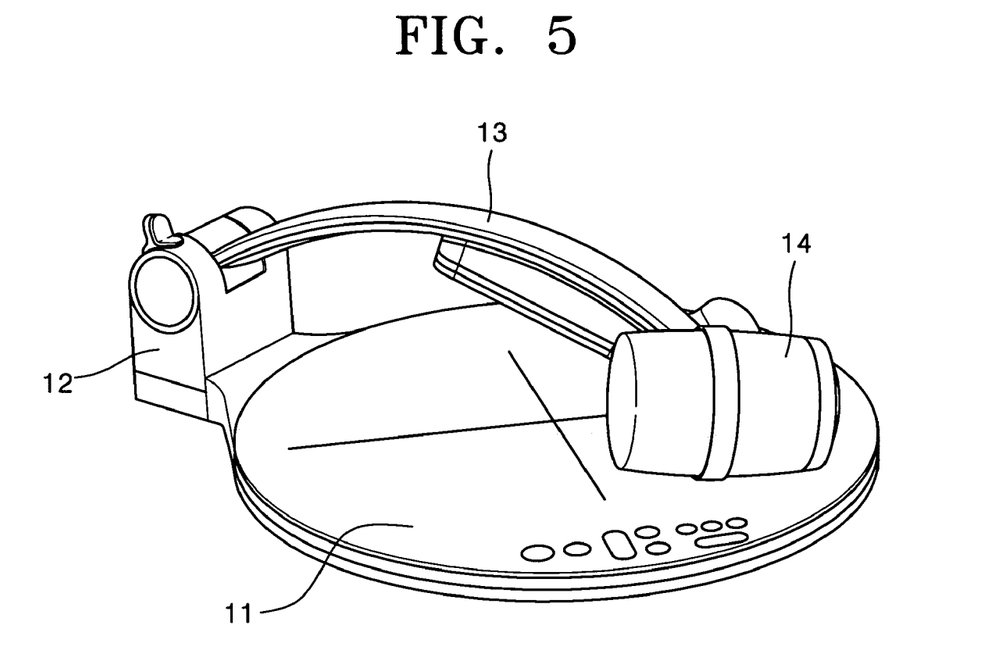
FIG. 5 is a perspective view of the video presenter of FIG. 1 with the support arm being in its collapsed position; and, FIG. 6 is an exploded view illustrating a part of the arc-shaped support arm of the video presenter of FIG. 1.

FIG. 5 shows the video presenter of FIG. 1 in a collapsed state. Referring to FIG. 5, a circumferential surface of the camera head 14 of the video presenter contacts the top surface of the table. For this, the first pivot housing 20 of the camera head 14 is first rotated with respect to the second pivot housing 19 attached at the end of support 13, then, support 13 is rotated downwards with respect to the pivot member 12.

As can be seen in FIG. 5, as the support 13 rotates fully making the camera head 14 in contact with the top surface of the circular table 11, the volume occupied by the video presenter is minimized. Thus, it is possible to store the video presenter in a restricted space.

Figure 6:
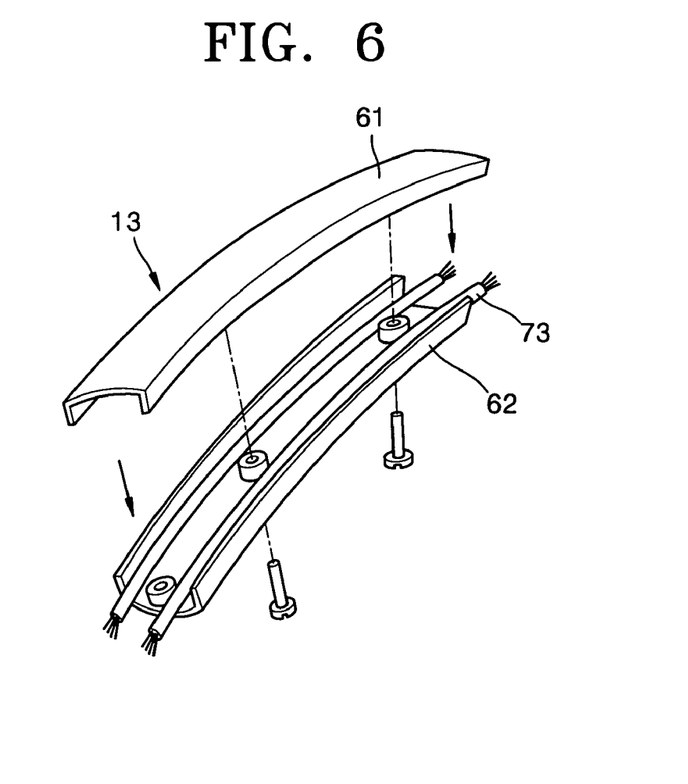

FIG. 6 shows a part of the support 13 of the video presenter. Referring to FIG. 6, the arched support 13 comprises a first portion 61 and a second portion 62. The first and second portions 61 and 62 of the support 13 are assembled to each other with bolts and form a space for passing cables 73 inside thereof. The cable 73 extends from the camera head 14 to a printed circuit board (not shown) in the table 11 through the support 13.

Figure 7:
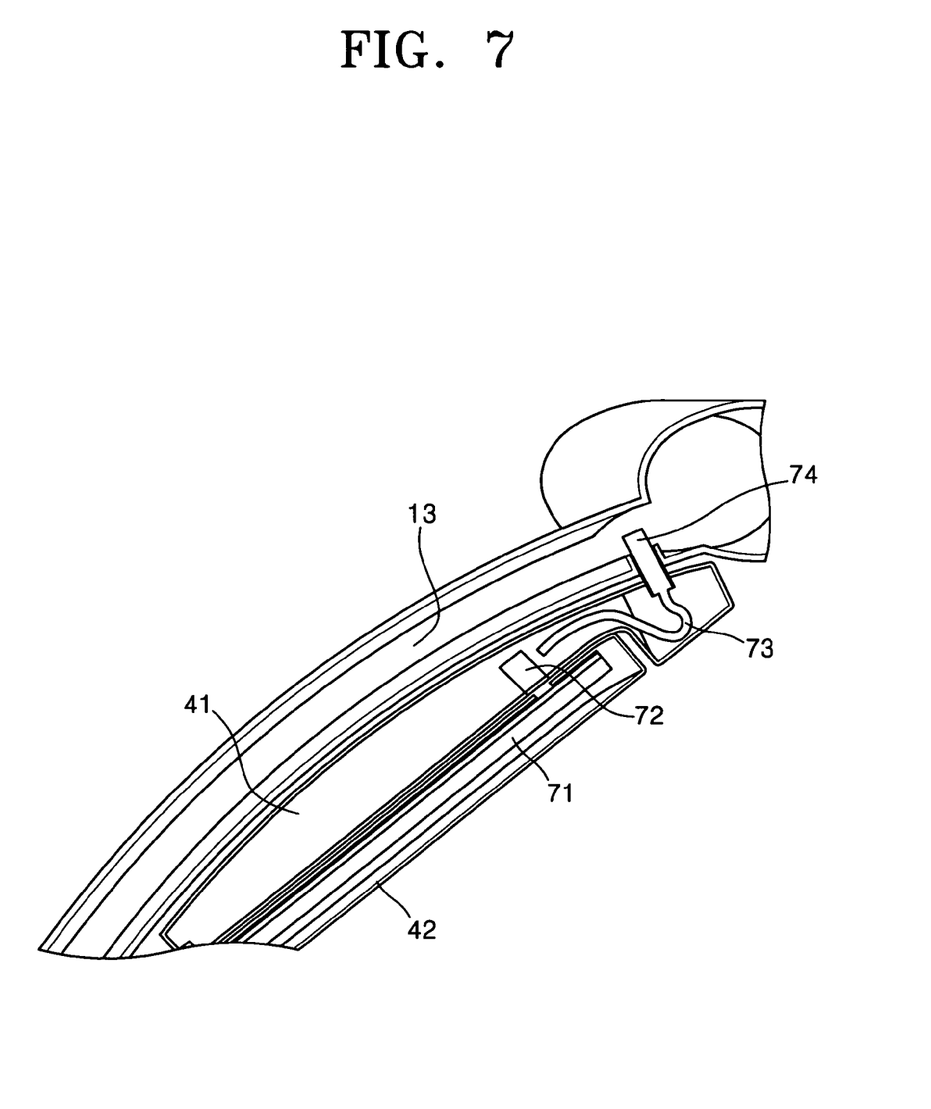
FIG. 7 is a schematic cross-sectional view of the lamp mount and the lamp holder of FIG. 4.

FIG. 7 shows a schematic and partial cross-sectional view of the lamp mount and the lamp holder as shown in FIGS. 1 and 4.

Referring to FIG. 7, the lamp holder 42 is rotatably coupled with the lamp mount 41 through a pivot 72. A lamp tube 71 is housed within the lamp holder 42. The illuminating orientation of the lamp tube 71 can be altered with rotation of the lamp holder 42 relative to the lamp mounter 41. Accordingly, it is possible to illuminate the object on the table at an optimum orientation. A power supply to the lamp tube 71 is achieved through an electric wire 73. One end of the electric wire 73 extends into the lamp holder 42 through the hollow pivot 72 and is coupled to the lamp tube 71, and the other end of the electric wire 73 is coupled to a plug 74. The plug 74 fit into corresponding holes formed at the lamp mount 41 and the arched support 13. As has been explained by referring to FIG. 4, while the bolts 43,44 serves to secure the lamp mount 41 to the arched support 13, the plug 74 provides a passage for the electric wire 73.

Figure 8A:
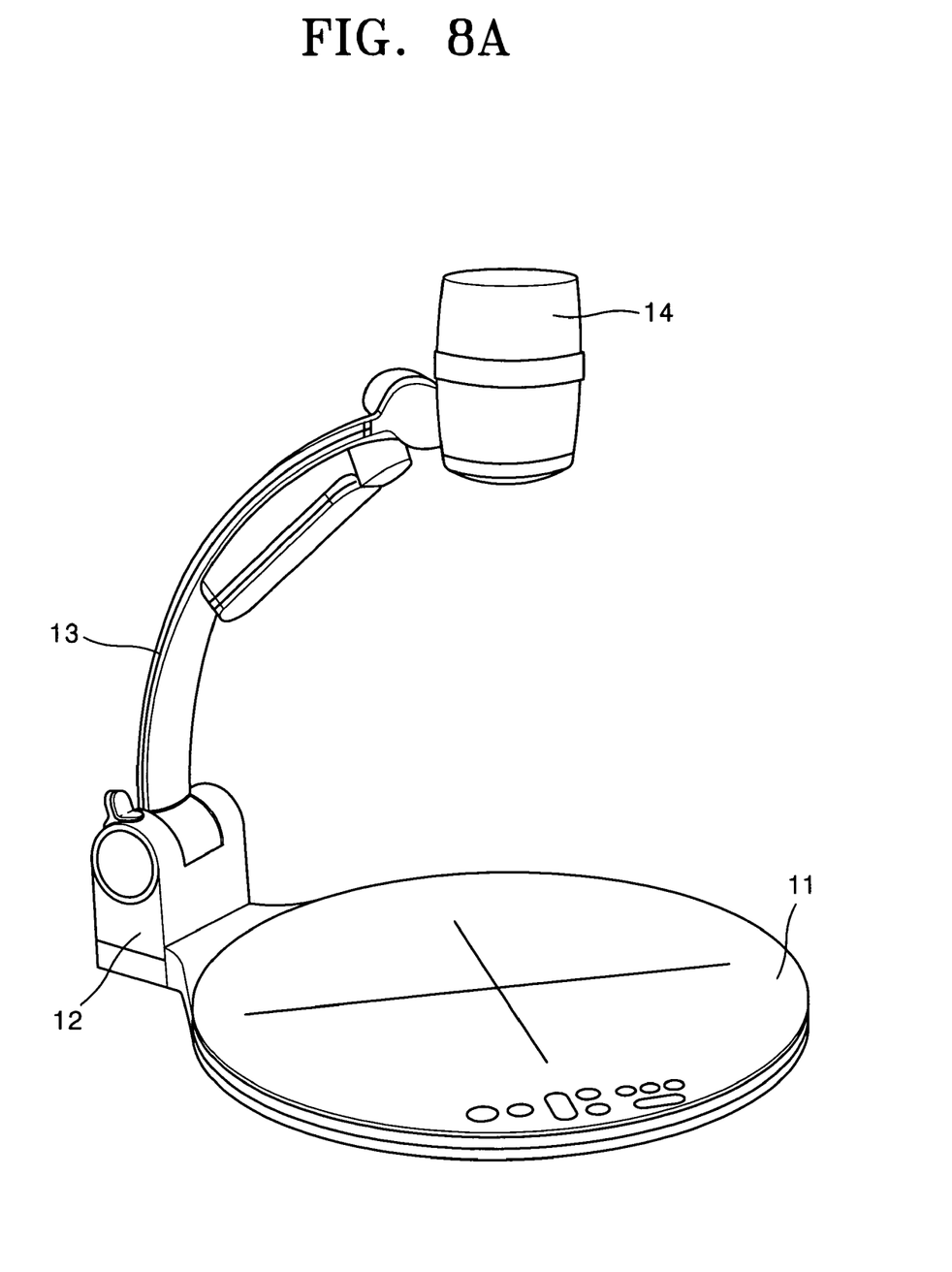
FIGS. 8A to 8C are perspective views of the video presenter of FIG. 1 with the lamp holder being in different orientations.
Figure 8B:
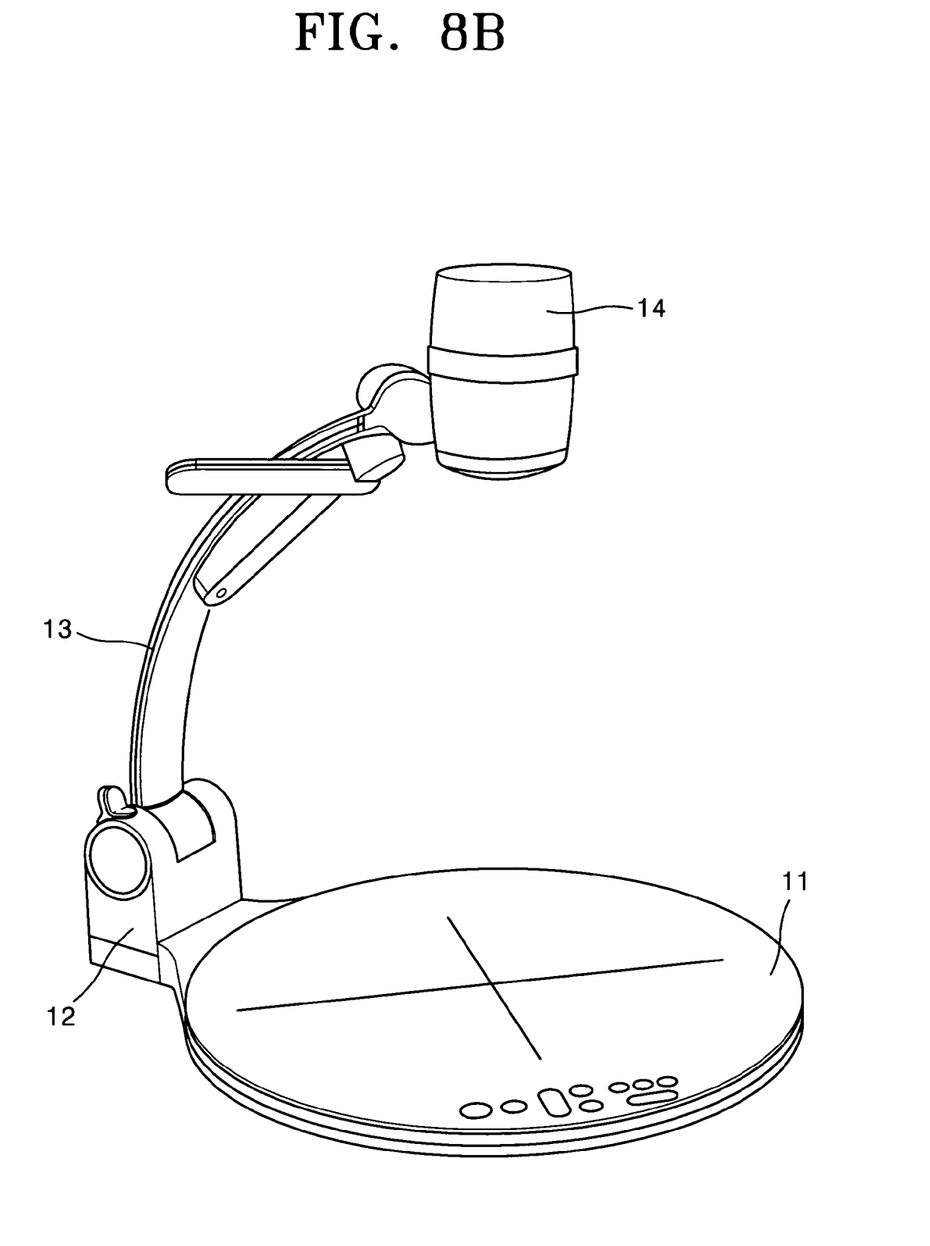
Figure 8C:
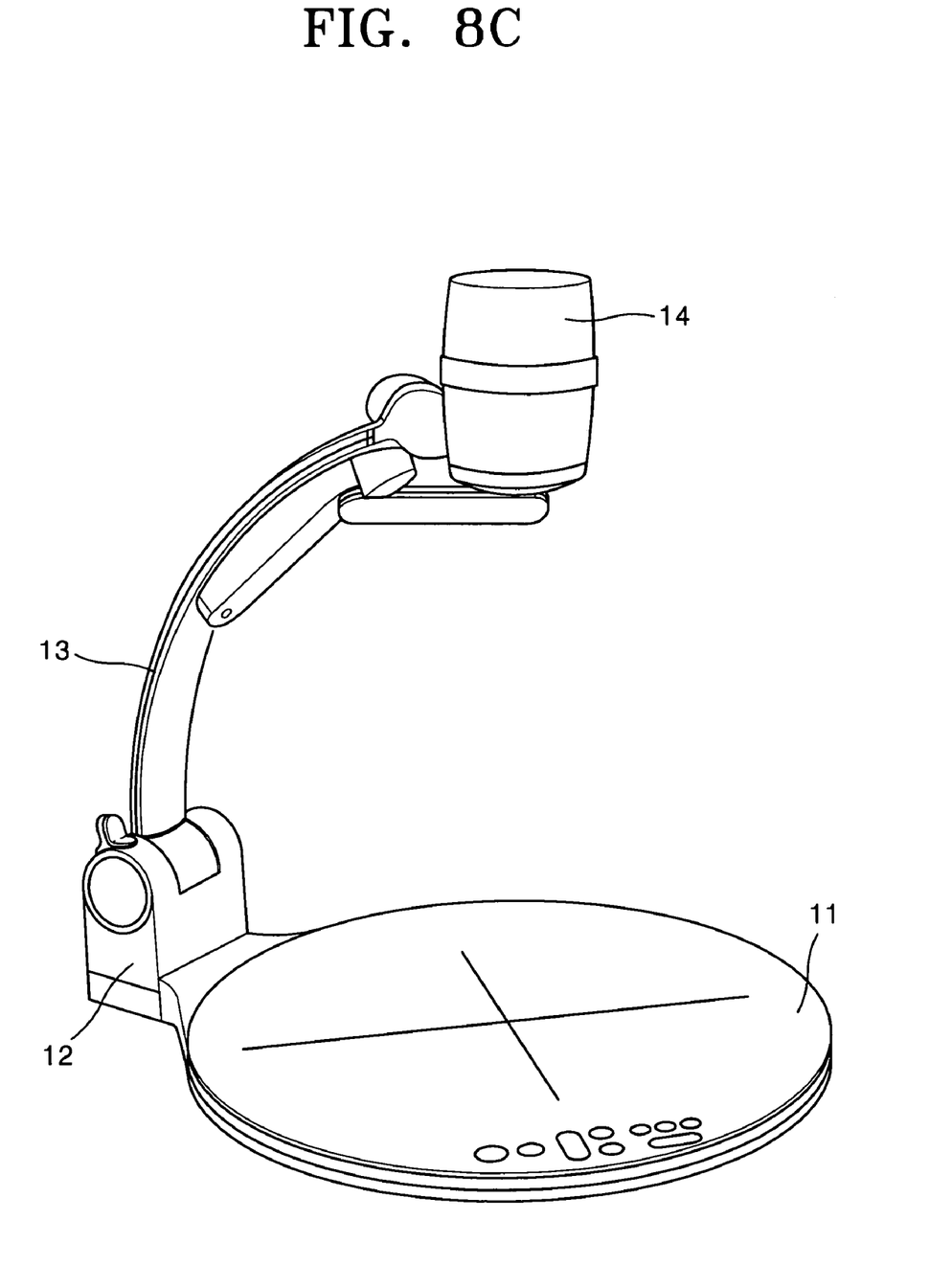

FIG. 8A to FIG. 8C show perspective views of the video presenter with the lamp holder being in different orientations.

Referring to FIG. 8A, the lamp holder 42 is disposed to be parallel to the lamp mount 41. Referring to FIGS. 8B and 8C, the lamp holder 42 is rotated with respect to the lamp mount 41. The selection of the illuminating orientations depends basically upon whether the object on the table is illuminated in an optimal condition.

The operation of the video presenter according to the present invention will be described herein below.

In order to display an image of the object using the video presenter of the invention, the video presenter should be connected to a display device through the connecting ports 25. For example, with a cable-connection between the USB port of the connecting ports 25 and another USB port of a personal computer (not shown), the image of the object captured by the video presenter can be displayed on a computer monitor.

In order to capture the image of an object, the user puts the object on the top surface of the table 11 and arranges the position of the camera head 14 preferably at a location adjacent to the object. Here, with the rotation of the support 13 relative to the pivot member 12, the camera head 14 may reach an appropriate position for capturing the image. At the same time, the camera head 14 can rotate with respect to the upper end of the support 13.

On the other hand, the lamp 15 can be rotated so as to illuminate the object at an optimal position. In other words, as shown in FIG. 4, the lamp 15 can reach the optimal position by rotating the lamp holder 42 relative to the lamp mount 41.

Further, the space for storing the video presenter may be minimized by collapsing the support 13 as described above.

As has been described herein above, the video presenter of the present invention has advantages in that a potential interference between the object and the arched support may be prevented and the camera head may be easily oriented towards the object without additional or frequent adjustments of the support arm and the camera. In addition, the table for placing the object is formed in a circular or disc-like shape so that the space defined on the table may be used with the maximum efficiency and the space for storing the video presenter may be minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A video presenter for inputting a video image of an object, comprising:
   a table with a top surface on which an object is to be placed;
   a pivot member mounted at a lateral side of the table;
   a support arm having a generally arched or arc-shaped configuration, the support arm extending from the pivot member and rotatably coupled with the pivot member;
   a camera rotatably coupled at a free end of the support arm; and
   a lamp attached directly to the support arm and adjustable between first and second positions to adjust illumination to the object.

2. A video presenter as claimed in claim 1, wherein the lamp is rotatably attached to the support arm at an inner surface of the support arm to adjust said illumination to the object.

3. A video presenter as claimed in claim 1, wherein the lamp comprises: a lamp mount fixed to the inner surface of the support arm; and a lamp holder having a lamp therein, the lamp holder rotatably coupled with the lamp mount to adjust said illumination to the object.

4. A video presenter as claimed in claim 1, wherein the pivot member and the support arm are configured in such a way that the camera is not allowed to contact with the table when the support arm is rotated towards the table.

5. A video presenter as claimed in claim 1, further including a rubber rim at least partially enclosing an outer surface of the camera.

6. A video presenter as claimed in claim 1, wherein the pivot member and the support arm are configured in such a way that a center of rotation of the support arm is displaced to a distance from the top surface of the table so as not to allow the camera to contact with the table when the support arm is rotated towards the table.

7. A video presenter as claimed in claim 6, wherein the camera is rotatable to assume a position oriented horizontally and generally parallel to the top surface of the table to store the video presenter with the support arm folded with respect to the table and with the camera rotated to the position oriented horizontally and generally parallel to the top surface of the table.

8. A video presenter as claimed in claim 7, further including a rubber rim around an outer surface of the camera to protect the camera from damage.

9. A video presenter for inputting a video image of an object, comprising:
- a table with a top surface for placing an object thereon;
- a pivot member mounted at a lateral side of the table;
- a support arm having a generally arched or arc-shaped configuration, the support arm extending from the pivot member and rotatably coupled with the pivot member;
- a camera rotatably coupled at a free end of the support arm; and
- a lamp attached to the support arm and adjustable between first and second positions to adjust illumination to the object;
- wherein the support arm includes an inner space along the support arm, and an electric cable is passed through the inner space and electrically connects the camera and the lamp to a controller provided in the table for controlling the operation of the video presenter.

10. A video presenter as claimed in claim 9, wherein the lamp comprises: a lamp mount fixed to the inner surface of the support arm; and a lamp holder having a lamp therein, the lamp holder rotatably coupled with the lamp mount to adjust said illumination to the object.

11. A video presenter as claimed in claim 9, wherein the camera is rotatable to assume a position oriented horizontally and generally parallel to the top surface of the table to store the video presenter with the support arm folded with respect to the table and with the camera rotated to the position oriented horizontally and generally parallel to the top surface of the table.

12. A video presenter as claimed in claim 11, further including a rubber rim around an outer surface of the camera to protect the camera from damage.

13. A video presenter as claimed in claim 11, wherein the pivot member and the support arm are configured in such a way that a center of rotation of the support arm is displaced to a distance from the top surface of the table so as not to allow the camera to contact with the table when the support arm is rotated towards the table.

* * * * *